United States Patent
Lahary et al.

(10) Patent No.: US 9,084,960 B2
(45) Date of Patent: Jul. 21, 2015

(54) METHOD FOR TREATING A GAS TO REDUCE THE CARBON DIOXIDE CONTENT THEREOF

(75) Inventors: Pierre-Yves Lahary, Lyons (FR); Gérard Mignani, Lyons (FR); Jean-François Viot, Senlis (FR)

(73) Assignee: RHODIA OPERATIONS, Aubervilliers (FR)

( * ) Notice: Subject to any disclaimer, the term of this patent is extended or adjusted under 35 U.S.C. 154(b) by 1119 days.

(21) Appl. No.: 13/121,860

(22) PCT Filed: Sep. 29, 2009

(86) PCT No.: PCT/FR2009/051851
§ 371 (c)(1),
(2), (4) Date: Jul. 28, 2011

(87) PCT Pub. No.: WO2010/037967
PCT Pub. Date: Apr. 8, 2010

(65) Prior Publication Data
US 2011/0293498 A1    Dec. 1, 2011

(30) Foreign Application Priority Data

Sep. 30, 2008  (FR) ..................... 08 56617

(51) Int. Cl.
| | | |
|---|---|---|
| *B01D 53/62* | (2006.01) | |
| *B01D 53/14* | (2006.01) | |
| *B01D 53/82* | (2006.01) | |
| *B01J 20/10* | (2006.01) | |
| *B01J 20/18* | (2006.01) | |
| *B01J 20/28* | (2006.01) | |
| *B01J 20/32* | (2006.01) | |

(52) U.S. Cl.
CPC ............ *B01D 53/1493* (2013.01); *B01D 53/82* (2013.01); *B01J 20/103* (2013.01); *B01J 20/18* (2013.01); *B01J 20/28004* (2013.01); *B01J 20/28057* (2013.01); *B01J 20/28069* (2013.01); *B01J 20/3204* (2013.01); *B01J 20/3206* (2013.01); *B01J 20/3251* (2013.01); *B01J 20/3257* (2013.01); *B01J 20/3272* (2013.01); *B01D 2253/106* (2013.01); *B01D 2253/202* (2013.01); *B01D 2253/304* (2013.01); *B01D 2253/311* (2013.01); *B01D 2257/504* (2013.01); *Y02C 10/04* (2013.01); *Y02C 10/06* (2013.01); *Y02C 10/08* (2013.01)

(58) Field of Classification Search
None
See application file for complete search history.

(56) References Cited

U.S. PATENT DOCUMENTS

| | | | |
|---|---|---|---|
| 4,112,185 A | | 9/1978 | Meiller |
| 5,618,506 A | * | 4/1997 | Suzuki et al. ................. 423/228 |
| 2010/0043813 A1 | * | 2/2010 | Eberhardt et al. ............ 131/332 |

FOREIGN PATENT DOCUMENTS

| | | | | |
|---|---|---|---|---|
| FR | 2905628 A1 | | 3/2008 | |
| JP | 05339410 A | | 12/1993 | |
| WO | WO 2004/054708 A2 | | 7/2004 | |
| WO | WO 2008/021700 A1 | | 2/2008 | |
| WO | WO2010/027335 | * | 3/2010 | ............... B01J 31/02 |

OTHER PUBLICATIONS

Williams, T.B. et al., "An Infrared Method for the Determination of Carbon Monoxide and Carbon Dioxide Levels in Cigarette Smoke." Beitrage zur Tabakforschung, Band 6, Heft 5 (Oct. 1972).*
Hongqun Yang, "Progress in carbon dioxide separation and capture: A review," Journal of Environmental Sciences, vol. 20, No. 1, Science Direct, Alberta, Canada, Available online as of Jan. 12, 2008 (see http://www.sciencedirect.com/science/article/pii/S1001074208600029).
International Search Report dated Mar. 23, 2010 (for PCT/FR2009/051851).

* cited by examiner

*Primary Examiner* — Stanley Silverman
*Assistant Examiner* — Daniel Berns
(74) *Attorney, Agent, or Firm* — Dentons US LLP

(57) ABSTRACT

The invention relates to a method for reducing the $CO_2$ content of a gas by contacting the gaseous effluent to be treated with an absorbent that contains a $CO_2$ trapping agent in the impregnated state on a substrate made of a solid composite material (M) containing a polymer (P) and a compound (C) selected from mineral oxides, silico-aluminates, and activated carbon, wherein said material (M) has an average particle size (D50) higher than or equal to 100 µm, and a pore space (Vd1) defined by pores having a diameter of between 3.6 and 1000 nm and which is at least 0.2 $cm^3/g$. The invention also relates to specific absorbents used in said method.

24 Claims, No Drawings

METHOD FOR TREATING A GAS TO REDUCE THE CARBON DIOXIDE CONTENT THEREOF

This application claims priority under 35 U.S.C. §119 of FR 0856617, filed Sep. 30, 2008, and is the United States national phase of PCT/FR2009/051851, filed Sep. 29, 2009, and designating the United States (published in the French language on Apr. 8, 2010, WO 2010/037967 A2; the title and abstract were also published in English), each hereby expressly incorporated by reference in its entirety and each assigned to the assignee hereof.

The present invention relates to a method for treating a gas containing carbon dioxide, by putting it into contact with an absorbing agent, with which the carbon dioxide content within the treated gas may be decreased. The invention also relates to the specific absorbent agents which are used within the scope of this method.

Carbon dioxide ($CO_2$) is a gas known to contribute to the greenhouse effect. For ecological reasons, consequently, one increasingly strives to limit the emissions of this gas into the environment. This problem most particularly concerns industrial installations, the activity of which generates gas effluents containing $CO_2$, such as for example thermal power stations, gas turbines, petrochemical refining units, cement works or further waste incineration installations.

Various methods have been developed with which $CO_2$ may be captured in gas effluents generated by these industries, in order to limit $CO_2$ emission into the atmosphere. Within this scope, methods have notably been described with which $CO_2$ may be captured in gases, which apply absorption of $CO_2$ via a gas-liquid route, i.e. by putting the gas containing $CO_2$ in contact with a liquid containing a compound absorbing $CO_2$. These methods, which typically apply amines in a solvent medium, as a $CO_2$ absorbent, have notably been recommended for treating fumes emitted by industrial installations, such as gas turbines or boilers. These methods do not prove to be entirely satisfactory, notably considering the instability of amines at high temperature. Further, the solvent used (typically water) generally has to be recovered at the end of the treatment (most often by evaporation), which has repercussions on the costs of the method.

Moreover methods applying absorption of $CO_2$ via a gas-solid route have been described, wherein solid absorbents are used instead of the aforementioned liquid absorbents. Within this scope, in particular the putting of the gas comprising $CO_2$ in contact with solids based on earth alkaline metals (in particular CaO or BaO), has been described. These solids may of course lead to relative efficient capture of $CO_2$, but the latter takes place by irreversibly consuming the absorbent and without any possibility of releasing the fixed $CO_2$, which leads to the quantative formation of salts which generally cannot be recovered, and which therefore most often require that they be stored, which is expressed in terms of cost and repercussion on the environment.

An object of the present invention is to provide a novel means for effectively treating a gas initially containing carbon dioxide in order to reduce the carbon dioxide content within this gas (or even to absorb the totality of the $CO_2$ initially present in the gas), and with which it is advantageously possible to immobilize the $CO_2$ in a form which may be handled, and preferably in a form from which all or part of the immobilised $CO_2$ may be recovered.

For this purpose, according to a first aspect, the present invention provides a novel method for treating a gas containing $CO_2$ in order to reduce the $CO_2$ content within this gas, wherein the gas to be treated is put into contact with an absorbent of a specific type.

This specific absorbent, which forms another object of the present invention, comprises at least one agent for $CO_2$ capture, this $CO_2$ capture agent being supported on a solid composite material (M) containing:
at least one, preferably porous, polymer (P); and
at least one compound (C) selected from mineral oxides, silico-aluminates and active coal,
wherein said material (M) has:
a mean particle size (D50) of at least 100 μm, more preferentially of at least 150 μm, this mean particle size generally remaining less than or equal to 2,000 μm,
a pore volume (Vd1), formed by the pores with a diameter comprised between 3.6 and 1,000 nm, of at least 0.2 cm³/g, and preferably at least 0.4 cm³/g.

By "$CO_2$ capture agent", is meant in the sense of the present invention, a compound or a mixture of compounds capable of reacting with $CO_2$ in order to form, preferably with high kinetics and quantatively, a solid or liquid compound (typically a carbonate salt or an addition product of $CO_2$ with the capture agent).

As well-adapted $CO_2$ capture agents according to the invention, mention may notably be made of mono-amines (in particular secondary amines, such as diethanolamine), polyamines, monoguanidines, and polyguanidines, and mixtures of these compounds.

Specific aminated $CO_2$ capture agents which may be contemplated according to the invention are:
amino alcoxysilanes fitting one of the following formulae:

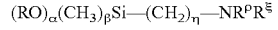

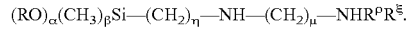

wherein:
α and β are two integers such that α+β=3 and α=1 or 2;
η and μ are two integers comprised between 1 and 18, for example between 2 and 10 (for example η=3 and μ=2); and
each of the radicals $R^\rho$ and $R^\xi$, either identical or different, designate —H or a saturated or unsaturated, linear or branched hydrocarbon group, optionally aromatic, typically an alkyl, alkenyl, aryl, arylalkyl or alkylaryl group having from 1 to 18 carbon atoms (for example a $C_1$-$C_8$ alkyl group).
phosphoryl derivatives of formula:

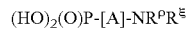

wherein:
[A]- is a saturated or unsaturated, linear or branched hydrocarbon chain, optionally aromatic, optionally interrupted by one or more hetero-atoms (S and/or O for example), for example an alkylene, alkenylene, arylene, arylalkylene or alkylarylene group having from 1 to 18 carbon atoms; and
each of the radicals $R^\rho$ and $R^\xi$, either identical or different, designates —H or a saturated or unsaturated, linear or branched hydrocarbon group optionally aromatic, typically an alkyl, alkenyl, aryl, arylalkyl or alkylaryl group having from 1 to 18 carbon atoms (for example a $C_1$-$C_8$ alkyl group).

Other usable $CO_2$ capture agents are carbenes, polyethers, and ionic liquids able to react with $CO_2$.

Within the scope of the present invention, the inventors have now shown that the $CO_2$ content in a gas initially containing $CO_2$ may be effectively reduced by putting this gas into contact with a $CO_2$ capture agent, notably of the aforementioned type, specifically in the supported state on a specific composite material as defined above. Within this scope, the reduction of the $CO_2$ content in the flow takes place according to a $CO_2$ absorption process of the solid-gas type which proves to be particularly efficient, and this notably when the $CO_2$ capture agent present on the support is selected from the preferential $CO_2$ capture agents described above, in particular monoamines, polyamines, monoguanidines and polyguanidines, molecules bearing nitrogen-containing heterocycles and carbenes.

Further, it is found that most often $CO_2$ capture performed by using a specific absorbent according to the invention is reversible. As a general rule, it is possible, and this by simple heat treatment of the absorbent which has been put into contact with the gas to be treated, to release the $CO_2$ and recover the absorbent, which may again be used for treating gas. This possibility in particular allows the use of the absorbent in a cyclic treatment/regeneration cycle, which is a notable advantage as compared with absorbents of the BaO or CaO type mentioned above.

Without intending to be bound to a particular theory, it seems that it may be put forward that interesting properties which have been observed by the inventors in terms of $CO_2$ absorption efficiency and capacity within the scope of the present invention are at least partly related to the specific porosity of the solid composite material (M). This porosity seems to lead to good $CO_2$ accessibility to the impregnated capture agent. On the other hand, the specific porosity of the material (M) generally leads to a protection of the capture agent against thermal degradation, which seems to be explained by a kind of protective stabilization effect of the capture agent within the environment of the supporting material.

Most often, the material (M) which is used according to the invention as a support for the $CO_2$ capture agents is a material which has strong cohesion, which most often is expressed by the fact that this support (and therefore the absorbent containing it) has a very low or even zero tendency to dusting in certain cases. This low dusting makes the supporting material (M) a support of choice for $CO_2$ capture agents and allows synthesis of absorbents particularly well adapted to an application in a gas treatment. Indeed, taking into account the fact that it does not have any tendency to generate fine particles, the supporting material does not lead to pressure drop or clogging phenomena which would be encountered if dusting absorbent agents were used.

Within this scope, it is advantageous that the material (M) which is used according to the present invention have cohesion such that its level of particles with a size of less than 100 μm obtained after an air pressure stress of 2 bars, typically according to the test described later on in the present description, is less than 1.5% by volume.

Advantageously, it is moreover preferred that the material (M) have a cohesion number $IC_N$ of more than 0.40. The cohesion number $IC_N$ to which reference is made herein corresponds to the ratio: (mean number particle size after an air pressure stress of 4 bars)/(number mean particle size without any air pressure stress (0 bars)), which is measured according to another specific test described later on in the present description.

In the most general case, the composite material (M) which is used as a support in the absorbent of the present invention comprises one polymer (P) or several polymers of this type; and one compound (C) or several compounds of this type. According to a particular embodiment, the supporting material (M) is exclusively formed with (i) one or more preferably porous polymers, including at least the polymer (P); and (ii) one or more compounds selected from mineral oxides, silico-aluminates and active coal including at least the compound (C).

The polymer (P) which is present in the material (M) used as a support according to the present invention is preferably selected from the following polymers: cellulose and its derivatives (such as for example cellulose acetate or cellulose sulfate); starch and its derivatives; alginates and their derivatives; polyethylene; guars and gums of the guar gum type, as well as their derivatives; and polyvinyl alcohols and their derivatives. When the polymer (P) is applied combined with other polymers, these additional polymers are themselves preferably selected from the polymers of the list above.

Typically, the polymer (P) may be one of the polymers hereafter: cellulose, cellulose acetate, cellulose sulfate, ethylcellulose; methycellulose; hydroxyethylcellulose; hydroxymethylcellulose; carboxymethycellulose; starch, carboxymethyl starch, starch-hydroxypropyl; arabic gum; agar; alginic acid, sodium alginate, potassium alginate; calcium alginate; tragacanth gum, guar gum; carob gum; polyvinyl acetates (optionally hydrolyzed), copolymers of polyvinyl acetates and of vinyl esters of aliphatic carboxylic acids; polyvinyl alcohols, polyethylene; copolymers of ethylene and vinyl esters of aliphatic saturated carboxylic acids, polycyclopentadiene hydrate.

According to a particular embodiment, the polymer (P) is cellulose or one of its derivatives (advantageously cellulose acetate or cellulose sulfate) polyethylene, gum arabic, polyvinyl alcohol.

Advantageously, the polymer (P) is a derivative of cellulose, preferably cellulose acetate, cellulose sulfate, ethylcellulose, hydroxyethylcellulose, methycellulose, hydroxymethylcellulose, carboxymethylcellulose.

More preferably, the polymer (P) is cellulose acetate. The cellulose acetate used may notably have a substitution degree between 1 and 3, for example between 2 and 2.9, notably of the order of 2.5. The substitution degree of a cellulose to which reference is made herein corresponds to the average number of esterified OH radicals per cellulose unit, which may range from 0 (for non-substituted cellulose), to 3 (for totally substituted cellulose).

The compound (C) which is present in the supporting material (M) used according to the present invention is preferably a mineral oxide. In particular, the compound (C) may comprise silica, or else a metal oxide such as alumina, zirconium oxide, titanium oxide, or iron oxide. According to a specific embodiment, this may be a rare earth oxide, such as cerium oxide. It should be noted that it is not required according to the invention (even if this may be contemplated) that the supporting material (M) have (i.e. in the absence of the $CO_2$ capture agent) $CO_2$ absorption capacities per se.

Alternatively, the compound (C) may be silico-aluminate, or else active coal (in particular coconut active coal).

According to a possible embodiment, the material (M) may comprise a mixture of several compounds selected from mineral oxides, silico-aluminates and active coals, for example a mixture of silica (notably precipitated silica) and active coal.

According to a preferred alternative of the invention, the compound (C) present in the material (M) is a silica, for example an amorphous synthesis silica. This may be precipitated silica, pyrogenated silica, colloidal silica, silica gel, or a mixture of the aforementioned silicas.

In a particularly advantageous way, the compound (C) present in the material (M) is precipitated silica. As non-limiting precipitated silicas which are of interest within the scope of the present invention, mention may for example be made of precipitation silicas obtained by reaction of a silicate (typically an alkaline metal silicate, such as sodium silicate), with an acidifying agent (typically sulfuric acid), generally by adding an acidifying agent onto a water and silicate starter. This reaction leads to obtaining a precipitated silica suspension, from which the precipitated silica may be recovered in dry form, usually by solid/liquid separation (typically by filtration which leads to a filtration cake), and drying (for example by atomization).

According to a particularly interesting embodiment, the polymer (P) is a derivative of cellulose, preferably cellulose acetate, and the compound (C) is silica, preferably precipitated silica of the aforementioned type. According to a specific embodiment, the material (M) consists in cellulose acetate and precipitated silica.

Regardless of the nature of the polymer (P) and of the compound (C), the material (M) used as a support in the absorbent of the invention is an advantageously porous material, which has specific characteristics in terms of mean particle size and pore volume.

The mean particle size (noted as D50) to which reference is made in the present invention, may typically be measured by laser diffraction according to the NF X 11-666 standard, with a granulometer of the MALVERN MASTERSIZER 2,000 type (from Malvern Instruments), in the absence of ultrasound and dispersants, by using as a measurement liquid degassed demineralized water (2 g of sample being dispersed in 50 mL of water with magnetic stirring) and the duration of the measurement is 5 seconds. The retained value is the average of three measurements carried out on the same sample consecutively.

In the absence of any specification, the term "mean particle size" or "D50" refers to the particle size of the material at atmospheric pressure, without any pressure generating a stress on the material. Mean sizes obtained under a pressure stress are noted as "$D50_p$", wherein p designates the pressure to which the tested material is subject under stress. In order to clear up any ambiguity, the mean so-called D50 particle size measured without any pressure stress may be noted as $D50_{0\ bars}$.

The supporting material (M) of the absorbent according to the invention has a mean particle size (D50) greater than or equal to 100 μm, generally at least 150 μm, and typically at least 200 μm. Preferably, this mean particle size remains less than 2,000 μm. It is typically comprised between 100 and 1,000 μm, in particular between 200 and 1,000 μm (between 250 and 950 μm for example), notably between 200 and 950 μm (between 250 and 950 μm for example).

Most often, the mean particle size of the supporting material (M) has a mean particle size greater than 250 μm and less than 2,000 μm, this size preferably being at least 300 μm, advantageously between 300 μm and a 1,000 μm, this size being more preferentially at least 400 μm.

Thus, according to a particular embodiment, the mean particle size (D50) may be comprised between 400 and 2,000 μm, in particular between 450 and 1,200 μm, notably between 400 and 1,000 μm. The mean particle size (D50) is preferably at least 450 μm, for example at least 500 μm, in particular at least 600 μm, this size may for example be comprised between 500 and 900 μm, notably between 540 and 900 μm, in particular between 540 and 800 μm.

Generally the composite material (M) has particle sizes comprised between 100 and 2,000 μm, more advantageously between 150 and 2,000 μm, notably between 200 and 1,800 μm, for example between 250 and 1500 μm, in particular between 400 and 800 μm, or event between 500 and 800 μm.

The pore volumes and pore diameters to which reference is made in the present description, are those measured by mercury porosimetry, typically with an Autopore MICROMERITICS 9520 porosimeter. In practice, the measurement of the pore volumes and pore diameters is typically carried out as follows: Each sample is dried beforehand for two hours at 90° C., under atmospheric pressure and then placed into a test container within 5 minutes following this drying and degassed in vacuo, for example by means of a vacuum pump; the samplings are of 0.22 gram (±0.01 gram); penetrometers No. 10 are used. The pore diameters are calculated by the WASHBURN relationship with a contact angle theta equal to 140° and a surface tension gamma equal to 484 dynes/cm. For determining the pore volumes in the sense of the present description, only pores having a diameter comprised between 3.6 and 1,000 nm are taken into account.

The supporting material (M) present in the absorbent of the invention has an intra-particulate pore volume (Vd1) formed by pores with a diameter comprised between 3.6 and 1,000 nm (i.e. accumulated pore volume of the pores with a diameter comprised between 3.6 and 1,000 nm), of at least 0.2 cm$^3$/g, advantageously at least 0.3 cm$^3$/g, and still more advantageously of at least 0.35 cm$^3$/g, this pore volume usually remaining less than or equal to 3.0 cm$^3$/g (the notation cm$^3$/g is meant here as cm$^3$ per gram of composite material (M)).

Preferably, the pore volume (Vd1) of the supporting material (M) of an absorbent according to the invention is at least 0.4 cm$^3$/g for example between 0.4 and 2.0 cm$^3$/g, notably between 0.45 and 1.5 cm$^3$/g.

Notably in the case when the compound (C) is silica (preferably precipitated silica), the pore volume (Vd1) of the material (M) is advantageously at least 0.5 cm$^3$/g, for example between 0.5 and 3.0 cm$^3$/g, notably between 0.5 and 2.0 cm$^3$/g, typically between 0.55 and 1.5 cm$^3$/g. Notably in the case when the compound (C) is silica (preferably precipitated silica), the pore volume (Vd1) of the composite material (M) may be at least 0.6 cm$^3$/g, in particular comprised between 0.6 and 3.0 cm$^3$/g, preferably between 0.6 and 2.0 cm$^3$/g, for example between 0.7 and 1.5 cm$^3$/g, or even 0.7 and 1.4 cm$^3$/g. Still more preferably, the pore volume (Vd1) of the material (M) is of at least 0.7 cm$^3$/g, in particular comprised between 0.7 and 2.0 cm$^3$/g, notably between 0.75 and 1.5 cm$^3$/g, for example between 0.8 and 1.4 cm$^3$/g. Still more preferably, the pore volume (Vd1) of the composite material (M) is at least 0.8 cm$^3$/g, in particular comprised between 0.8 and 3.0 cm$^3$/g, notably between 0.8 and 2.0 cm$^3$/g, for example between 0.9 and 1.4 cm$^3$/g.

Notably, when the compound (C) is silica, in particular precipitated silica, the pores with a diameter comprised between 3.6 and 1,000 nm present within the material (M) advantageously have an average pore diameter of greater than 11 nm (for example comprised between 11 (not included) and 100 nm or between 11 (not included) and 50 nm). Preferably, this average diameter of pores with a diameter comprising 3.6 and 1,000 nm is at least 11.5 nm, and more advantageously at least 12 nm, for example between 11.5 and 100 nm; notably between 11.5 and 50 nm, in particular between 12 and 40 nm, notably between 12 and 40 nm, for example between 12 and 25 nm or between 12 and 18 nm; it may also vary between 13 and 40 nm, in particular between 13 and 25 nm, for example between 13.5 and 25 nm, or even between 13.5 and 18 nm.

The cohesion properties of the material (M) may notably be measured by applying the following cohesion test.

A laser granulometer of the MALVERN MASTERSIZER 2,000 type (from Malvern Instruments) coupled with the Sirroco module for sampling via a dry route is used. The analysis is carried out with the optical Fraunhofer model, with a measurement time of 5 seconds.

A first analysis is carried out by introducing the material only tested by the vibration of the hopper and suction, in order to have access to the initial size of the product. This initial size of the product corresponds to its number mean particle size (the aforementioned mean particle size $D50_{0\ bars}$), which is also designated by the term of "number mean particle size without any air pressure stress".

A second analysis is carried out by injecting air pressure via the nozzle of the sampling module, which allows stress to be exerted on the material. The level of possible fine particles (particles with a size of less than 100 µm), generated by this stress allows evaluation of the cohesion (or hardness) of the product (the material being all the less cohesive since the amount of generated fine particles is large).

The air pressure applied via the nozzle of the sampling module during this second analysis may for example be 2 bars (i.e. $2.10^5$ Pa). This imposed pressure value of 2 bars is a reference value, which corresponds to the limiting value from which one begins to obtain a stress leading to an onset of attrition for a material exclusively consisting of active coal.

The measurements below carried out at 2 bars on the sole active coal are the reference values against which a material (M) according to the invention may be evaluated (volume %):
  level of particles with a size below 100 µm=2.0%
  level of particles with a size below 20 µm=0.0%

For information, at 0 bar (i.e. without any imposed air pressure) the following measurements are obtained for active coal alone:
  level of particles with a size below 100 µm=0.0%
  level of particles with a size below 20 µm=0.0%

Alternatively or as an addition to the analysis above with an air pressure of 2 bars, a second analysis may be carried out by applying an air pressure of 4 bars ($4.10^5$ Pa) via the nozzle of the sampling module. For this pressure value, the appearance of fine particles is observed in the case of a material only consisting of active coal granules.

The level of attrition undergone by the product tested at this pressure of 4 bars may be evaluated by comparing the grain size distribution measured without any air pressure stress (0 bars) on the one hand, and the grain size distribution measured after an air pressure stress of 4 bars on the other hand. More particularly, the indicator retained for the grain size distribution is the number mean size of particles (the aforementioned $D50_p$). More specifically, the difference between the mean size without any pressure stress ($D50_{0\ bars}$) and the number mean size after an air pressure stress of 4 bars ($D50_{4\ bars}$) is observed. Within this scope, the cohesion number $IC_N$, which is calculated by the $D50_{4\ bars}/D50_{0\ bars}$ ratio (i.e. at the (number mean size of particles after an air pressure stress of 4 bars)/(number mean size of particles without any air pressure stress) ratio). This number reflects the resistance to attrition exhibited by the product, i.e. its cohesion: the higher the cohesion number $IC_N$ the more the product resists to attrition, i.e. the more cohesive is the product.

The composite material (M) used according to the invention advantageously has a cohesion force such that the material does not generate any dust during its handling. Notably for this purpose, if is preferred that the level of particles with a size below 100 µm obtained after an air pressure stress of 2 bars, according to the cohesion test described above, be less than 1.5%, preferably less than 0.5%.

In practice, it is generally interesting to use a composite material (M) having a level of particles with a size below 20 µm obtained after an air pressure stress of 2 bars, according to the cohesion test described above, equal to 0.0% by volume.

Moreover, it proves to be most advantageous if the composite material (M) used according to the invention has a cohesion such that its cohesion number $IC_N$ ($D50_{4\ bars}/D50_{0\ bars}$ ratio, as measured under the conditions defined above) is greater than 0.40, and still more preferentially greater than 0.50, more advantageously of at least 0.60 or even at least 0.75. Moreover, the number mean particle size after an air pressure stress of 4 bars ($D50_{4\ bars}$), as established according to the cohesion test described above, is advantageously greater than 350 µm, in particular greater than 400 µm, for example greater than 500 µm.

Advantageously, i.a. when the compound (C) is silica (preferably precipitated silica), its cohesion is such that its cohesion number $IC_N$ is greater than 0.60, preferably greater than 0.80, in particular at least 0.90.

Moreover, it is generally preferable that the material (M) have a level of particles with a size below 20 µm and a level of particles with a size below 100 µm obtained without any air pressure stress, according to the cohesion test described above, which are both equal to 0.0% by volume.

Advantageously, and this in particular when the compound (C) is notably precipitated silica, the cohesion of the material (M) is such that its level of particles with a size below 100 µm obtained after an air pressure stress of 2 bars, according to the cohesion test described above, is equal to 0.0% by volume.

Good cohesion properties, leading to very limited or even zero dusting, are in particular obtained when the compound (C) is silica, notably precipitated silica, and when the polymer (P) is a derivative of cellulose, in particular cellulose acetate.

Notably when the compound (C) is silica, in particular precipitated silica, the packed filling density (PFD), which may be measured according to the ISO 787/11 standard, of the material (M) may advantageously be of at least 0.30, for example greater than 0.32, typically comprised between 0.33 and 0.35.

Regardless of its exact nature and of its cohesion properties, the supporting material (M) present in the absorbents of the invention usually has a BET specific surface area of at least 50 m²/g. In general, its BET specific surface area remains less than 1,300 m²/g, and in particular of at most 1,200 m²/g, notably at most 1,000 m²/g, for example at most 900 m²/g, or even at most 700 m²/g (m² per gram of the composite material).

The BET specific surface area to which reference is made herein, is determined according to the BRUNAUER-EMMETT-TELLER method described in "The Journal of the American Chemical Society, Vol. 60 page 309, February 1938 and corresponding to the NF ISO 9277 standard (December 1996).

The BET specific surface area of the material (M) may be of at least 100 m²/g, generally at least 160 m²/g, preferably at least 200 m²/g (for example greater than 300 m²/g); it may be comprised between 250 and 1,300 m²/g, in particular between 280 and 1,200 m²/g, for example between 280 and 800 m²/g. It may also be comprised between 320 and 1,000 m²/g, in particular between 320 and 900 m²/g, notably between 320 and 700 m²/g, or even between 320 and 600 m²/g. For example in the case when the compound (C) is silica, in particular precipitated silica, the BET specific surface area of the composite material according to the invention may be comprised between 200 and 800 m²/g, in particular between 200 and 600 m²/g, notably between 210 and 500 m²/g, notably between 210 and 400 m²/g (for example between 210 and 300 m²/g).

The specific surface area of the composite material (M) is essentially a function of the specific surface area of the compound (C), of the content of said compound (C) within the material (M) and of the accessibility to the surface of the compound (C) within the composite material, which is allowed by the porosity of the polymer (P). Often, the composite material (M) retains a large portion (typically at least 60%) of the specific surface area of the compound (C). This is most particularly the case when the compound (C) is silica (notably precipitated silica) and when the polymer (P) is cellulose acetate.

According to a particular embodiment of the invention, particularly suitable when the compound (C) is silica (preferably precipitated silica) and when the polymer (P) is cellulose acetate, the supporting material (M) used according to the invention advantageously has:
- a mean particle size (D50) of at least 300 μm (and typically not exceeding 2,000 μm), this size may for example be comprised between 400 and 1,000 μm, notably between 500 and 1,000 μm,
- a BET specific surface area greater than 300 $m^2/g$ (and which generally remains less than or equal to 1,200 $m^2/g$), this specific surface area may in particular be comprised between 320 and 900 $m^2/g$, notably between 320 and 700 $m^2/g$, for example between 320 and 500 $m^2/g$, and typically between 340 and 430 $m^2/g$; and
- a cohesion such that its level of particles with a size below 100 μm obtained after an air pressure stress of 2 bars, according to the cohesion test described above is equal to 0.0% by volume.

According to another interesting embodiment of the invention, particularly suitable when the compound (C) is silica (preferably precipitated silica) and when the polymer (P) is cellulose acetate, the supporting material (M) used according to the invention advantageously has:
- a mean particle size (D50) of at least 400 μm (and for example of at most 2,000 μm), notably comprised between 400 and 1,000 μm, for example between 500 and 800 μm,
- a BET specific surface area of at least 200 $m^2/g$ (and for example of at most 1,000 $m^2/g$), preferably comprised between 200 and 800 $m^2/g$, in particular between 200 and 600 $m^2/g$, notably between 200 and 500 $m^2/$, for example between 200 and 400 $m^2/g$, or even between 210 and 400 $m^2/g$ or between 210 and 300 $m^2/g$; and
- a cohesion such that the cohesion number $IC_N$ ($D50_{4\ bars}$/$D50_{0\ bars}$ ratio, as measured under the conditions defined above) is greater than 0.60, in particular greater than 0.80.

Generally, the composite material (M) which is used as a support according to the invention advantageously has a polymer (P) content comprised between 10 and 95%; preferably between 15 and 45% by mass, based on the total mass of the composite material (M). The compound (C) content of the composite material (M) is as for it generally comprised between 5 and 90%, preferably between 55 and 85% by mass, based on the total mass of the composite material (M).

The composite material (M) which is used according to the present invention may notably appear as extrudates for example cylindrical extrudates, or more preferentially as granules, notably as substantially spheroidal granules.

The composite material (M) applied according to the invention, which advantageously has the aforementioned features, may typically be obtained according to a method comprising the following successive steps (e1) to (e5);
(e1) a solution of a polymer (P) in a solvent (S) is formed, and the compound (C) is then added to said solution, preferably with stirring (it being understood that the solution of the polymer (P) in the solvent (S) may optionally contain at least one polymer other than the polymer (P), this polymer being advantageously porous and that the compound (C) may optionally be added together to at least one other compound selected from mineral oxides, silico-aluminates and active coal),
(e2) the mixture obtained in step (e1) is shaped, preferably by granulation or extrusion,
(e3) the shaped product from step (e2) is introduced into a non-solvent liquid medium (NS) for the polymer (P) and at least partly miscible with the solvent (S) used in the polymer (P) solution, whereby the polymer (P) is insolubilised,
(e4) at least one washing of the product obtained at the end of step (e3) is carried out in order to at least partly remove the solvent used in the polymer (P) solution,
(e5) the solid product from step (e4) is dried.

The compound (C) used in step (e1) of the method may be selected from mineral oxides, silico-aluminates and active coals. The compound (C) may for example be selected from adsorbents and catalyst supports. Preferably, this is silica, preferably a precipitation silica, typically obtained by reaction of a silicate (typically an alkaline metal silicate, such as sodium silicate), with an acidifying agent (typically sulfuric acid), generally by addition of an acidifying agent on a silicate starter, and/or total or partial simultaneous addition of an acidifying agent and of silicate on a water and silicate starter, with which it is possible to obtain a suspension of precipitated silica, said silica being usually separated from the suspension, in particular by filtration (with a filtration cake being obtained), and then dried (generally by atomization).

Regardless of its exact nature, the compound (C) used in step (e1) advantageously has a relatively high specific surface area. Thus it generally has a BET specific surface area of at least 100 $m^2/g$, preferably at least 200 $m^2/g$, in particular greater than 450 $m^2/g$. The succession of the aforementioned steps (e1) to (e5) allows a good portion (generally at least 60%) of the specific surface area of the compound (C) to be retained in the synthesized supporting composite material (M).

Moreover, the compound (C) used in step (e1) usually has a mean particle size of at least 0.5 μm, in particular comprised between 0.5 and 100 μm. When the compound (C) is precipitated silica, this mean particle size is preferably more particularly comprised between 0.5 and 50 μm, notably between 0.5 and 20 μm, for example between 2 and 15 μm.

In particular, when this is silica, notably precipitated silica, the compound (C) used in step (e1) of the method according to the invention, preferably has a DOP oil absorption of less than 260 mL/100 g, notably less than 240 mL/100 g, for example less than 225 mL/100 g, this oil absorption may in certain cases be less than 210 mL/100 g, or even than 205 mL/100 g. The oil absorption DOP of a compound (C) used in step (e1) generally remains greater than or equal to 80 mL/g, and it is typically greater than 145 mL/100 g, for example greater than 180 mL/100 g. The DOP oil absorption to which reference is made herein, is the one determined according to the ISO 787/5 standard applying dioctylphthalate (the measurement being carried out on the compound (C) as such.

On the other hand, the compound (C) used in step (e1) preferably has a CTAB specific surface area (an external surface area determined according to the NF T 45007 (November 1987) standard) of greater than 280 $m^2/g$, notably greater than 300 $m^2/g$, in particular greater than 330 $m^2/g$, for example greater than 350 $m^2/g$; this specific surface area being generally less than or equal to 450 m²/g, in particular when this is silica, notably precipitated silica.

The compound (C) applied in step (e1) preferably has a pore volume ($V_{d25}$), formed by pores with a diameter of less than 25 nm, greater than 0.8 mL/g, notably above 0.9 mL/g (in particular when this is notably precipitated silica). The pore volume $V_{d25}$ to which reference is made herein corresponds to the diameter determined by the method of Barett, Joyner and Halenda, said BJH method, notably described by F. Rouquerol, L. Luciani, P. Llewwellyn, R. Denoyel and J. Rouquerol, in the <<Les Techniques de l'Ingénieur>> September 2001).

Moreover, it is often advantageous if the compound (C) applied in step (e1) has a pore diameter ($d_p$) for pores with a diameter of less than 25 nm, taken at the maximum of the volume pore size distribution, of less than 12.0 nm, in particular of less than 8.0 nm (the Barett, Joyner and Halenda method).

As compounds (C) well adapted for the application of step (e1), mention may be made of precipitated silicas having the following features:
- a DOP oil absorption of less than 260 mL/100 g, notably less than 240 mL/100 g, in particular less than 225 mL/100 g; and
- a pore volume ($V_{d25}$), formed by pores with a diameter of less than 25 nm, greater than 0.8 mL/g, notably greater than 0.9 mL/g, for example of at least 0.95 mL/g (advantageously associated with a pore diameter (dp) for pores with a diameter of less than 25 nm, taken at the maximum of the volume pore size distribution, of less than 12 nm, in particular less than 8 nm); and
- a CTAB specific surface area greater than 280 m²/g, notably greater than 300 m²/g, in particular greater than 330 m²/g, for example greater than 350 m²/g; and
- preferably, a BET specific surface area greater than 450 m²/g, for example greater than 510 m²/g.

A precipitation silica of this type may for example be prepared by a method comprising the reaction of a silicate with an acidifying agent; whereby a suspension of precipitated silica is obtained, and then separated and dried, (notably by atomization) of this suspension, where the reaction of the silicate with the acidifying agent is preferably conducted according to the following successive steps:
(i) an initial starter is formed only including a portion of the total amount of silicate engaged into the reaction, the silicate concentration (expressed as $SiO_2$) in said initial starter being comprised between 10 and 50 g/L, preferably between 12 and 48 g/L, in particular between 15 and 45 g/L, and a temperature of said initial starter being comprised between 40 and 65° C.,
(i') optionally, some acidifying agent is added to said starter, for 5 to 30 minutes, until a pH value of the reaction medium comprised between 3.5 and 8.5 is obtained.
(ii) some acidifying agent and the remaining amount of silicate are added to said starter, preferably simultaneously for 20 to 150 minutes, the added silicate amount (expressed as $SiO_2$)/amount of silicate present in the initial starter (expressed as $SiO_2$) ratio is greater than 5:
  a) either at constant flow rates leading to a pH value of the reaction medium comprised between 3.5 and 8.5 at the end of the simultaneous addition,
  b) or at a regulated acidifying agent flow rate so as to maintain the pH of the reaction medium to a constant value comprised between 3.5 and 8.5,
(iii) in the case when the pH value of the reaction medium at the end of step (ii) is greater than 6.0, some acidifying agent is added to the reaction medium for 3 to 25 minutes, so as to attain a pH value of the reaction medium comprised between 3.5 and 6.0,
(iv) the reaction medium obtained at the end of the previous step is maintained with stirring for 5 to 60 minutes.

Regardless of its exact nature, the compound (C) applied in step (e1) may be a functionalized compound, notably by grafting or by adsorption of organic molecules, for example comprising at least one amino, phenyl, alkyl, cyano, nitrile, alkoxy, hydroxyl, amide, thio and/or halogen function.

In step (e1) of the method according to the invention, the compound (C) is mixed with a solution of the polymer (P), preferably with stirring, which allows dispersion of the compound (C) (in solid form) in a medium formed by the polymer (P) in solution in the solvent (S). According to a particular embodiment, the mixture is made by introducing the compound (C) gradually into the solution of the polymer (P), whereby a homogeneous mixture is obtained. For applying step (e1), a mixer of the granulator type, for example of the Rotolab Zanchetta type, may advantageously be used here.

As a solvent (S) in step (e1), it is notably possible to use acetic acid (in particular when the polymer (P) is cellulose acetate), water (in particular in the case when the polymer (P) is cellulose sulfate, a polyvinyl alcohol or gum arabic), or else further a naphthenic oil (in particular in the case when the polymer (P) is polyethylene).

When the polymer (P) is cellulose acetate, the latter is generally put into solution in a mixture of acetic acid+water, for example in the following proportions (expressed by mass based on the total mass of cellulose acetate, acetic acid and of water);
cellulose acetate: 10 to 25%
acetic acid: 65 to 80%
water: 5 to 15%

At the end of step (e1) it may be advantageous to add a solvent to the obtained polymer (P) and compound (C) mixture (for example acetic acid in the case when the polymer (P) is cellulose acetate) which notably allows reduction in the viscosity of the mixture.

The polymer (P) and compound (C) proportions applied in step (e1) depend on the desired proportions in the final composite material. Generally, in the mixture made in step (1), the polymer (P) content is comprised between 10 and 95%, preferably between 15 and 45%, by weight, and compound (C) content comprised between 5 and 90%, preferably between 55 and 85%, these contents being expressed by mass, based on the total mass of polymers and compounds of the type: mineral oxides, silico-aluminates and active coal within the mixture prepared in step (e1).

The step (e2) for shaping the mixture obtained at the end of step (e1) may be carried out by compaction (for example by means of an Alexanderwerk compacter).

Nevertheless, preferably, the step (e2) is rather carried out by granulation or by extrusion.

When granulation is applied, the latter may take place continuously or batchwise, and the product obtained at the end of the step (e2) appears as granules. The granulation is usually carried out with stirring and is typically carried out at room temperature (temperature of the installation site, for example between 5 and 35° C.).

The granulation may be carried out in a mechanical granulator with a rotor, for example a rotor granulator equipped with plough-shares, notably a Lödige granulator, with a moderate shearing rate. The granulation is preferably carried out in a granulator with a high shearing rate. Preferably a granulator with a rotor equipped with blades or pins is used, in particular a Rotolab Zanchetta granulator, which generally operates batchwise.

Advantageously, when granulation is applied in step (e2), it is preferable to fill the bowl (tank) of the granulator up to a height from 25 to 75% of its volume with the mixture obtained at the end of step (e1), in particular in the case of a Rotolab Zanchetta granulator. The speed of the rotor of the granulator, in particular in the case of a Rotolab Zanchetta granulator, may be comprised between 200 and a 1,000 rpm, for example between 400 and 600 rpm.

When extrusion is applied in step (e2), the latter may be high pressure extrusion (for example by means of a piston press type apparatus) or low pressure extrusion (for example by means of a Fuji Paudal type apparatus). The shaped product obtained at the end of step (e2) then appears as extrudates, generally with a cylindrical shape.

Optionally, at the end of step (e2) and prior to step (e3), an optional calibration and/or milling step may be applied in order to eliminate the possible products not having the desired size. This method may optionally further comprise a spheronization step so as to increase the spheroidal nature of the product.

In step (e3) of the method, the polymer (P) is insolubilized (precipitated) by introducing the product from step (e2) into a liquid (NS) which is not a solvent of the polymer (P). This non-solvent (NS) is at least partly and preferably totally miscible with the solvent (S) used in the polymer (P) solution applied in step (e1). The insolubilization of the polymer (P) which takes place in step (e3) forms from the polymer (P), a porous solid matrix in which the compound (C) is again found dispersed. Step (e3) is advantageously carried out with stirring.

As a non-solvent (NS) in step (e3), it is for example possible to use water, in particular when the polymer (P) is cellulose acetate and the solvent used is acetic acid, or else further a diluted aqueous solution of acetic acid (in particular when the polymer (P) is cellulose acetate and the solvent used is acetic acid), ethanol (in particular in the case when the polymer (P) is cellulose sulfate and the solvent used is water), a carboxylic acid (in particular in the case when the polymer (P) is a polyvinyl alcohol and the solvent used is water), an alcohol in particular in the case when the polymer (P) is gum arabic and the solvent used is (hot) water), hexane (in particular in the case when the polymer (P) is polyethylene and the solvent used is a naphthenic oil).

In step (e3), the non-solvent (NS) is advantageously heated typically to a temperature above 30° C., or even to a hot temperature of 40° C., prior to its putting into contact with the shaped product obtained in step (e2). Thus, for example, when the polymer (P) is cellulose acetate and the non-solvent (NS) is water, the water may be used at a temperature comprised between 30 and 90° C., in particular between 45 and 75° C., or even between 50 and 70° C., and step (e3) is typically conducted by using the product from step (e2) in water brought beforehand to the aforementioned temperature.

In step (e3), typically roughly 70 to 130 grams of shaped product from step (e2) are treated per liter of non-solvent (NS), in particular when the non-solvent is water.

In step (e4) of the method, one or more washings of the product obtained at the end of step (e3) are carried out, in order to at least partly and preferably totally remove the residual solvent. This washing may be carried out with water, notably in the case when the solvent used for the polymer (P) is acetic acid. Generally, before applying step (e4), the product obtained at the end of step (e3) is separated from the liquid used in step (e3).

After step (e4), and before step (e5), a (preferably mild) dewatering step may optionally be conducted.

With the drying step (e5), it is possible to remove the washing liquid used in step (e4). Notably when the washing liquid is water and in particular when the polymer (P) is cellulose acetate, the drying step (e5) may advantageously be carried out at a temperature comprised between 50 and 120° C., for example in a ventilated device (notably an oven or a fluid bed), generally for 2 to 60 hours, in particular between 5 and 30 hours.

The composite material obtained at the end of step (e5) typically has particles sizes comprised between 100 and 2,000 μm, notably between 200 and 1500 μm, in particular between 200 and 800 μm, or even between 400 and 800 μm. Optionally, after the drying step (e5), a milling and/or sifting (separation) step may be conducted in order to remove possible products not having the desired size, notably depending on the targeted applications.

Also, preferably, with the method according to the invention it is possible to obtain a composite material which retains a large portion (for example at least 60%) of the specific surface area of the compound (C) used, in particular when the polymer (P) is cellulose acetate, notably in the case when the compound (C) is active coal and/or especially silica (preferably precipitated silica).

According to another embodiment, which often proves to be advantageous, the composite material (M) applied according to the invention may be obtained as particles (typically granules), according to a method comprising the following successive steps ($\epsilon$1) to ($\epsilon$5):

($\epsilon$1)—the compound (C); and
  a solution of the polymer (P) in a solvent (S),
  are introduced into an extruder:
    it being understood that the solution of the polymer (P) in the solvent (S) may optionally contain at least one polymer other than the polymer (P), this polymer being advantageously porous, and the compound (C) may optionally be added together with at least one other compound selected from mineral oxides, silico-aluminates and active coal;

($\epsilon$2) the mixture of the polymer (P) and of the compound (C) is caused to migrate within the extruder, towards an outlet of the extruder, the extruder being provided at this outlet:
  with a plate perforated with hole(s); and
  with blades, located between said perforated plate and said outlet of the extruder,
  and said provided outlet opening out into a bath comprising a liquid (NS) which is a non-solvent of the polymer (P) and which is at least partly miscible with the solvent (S), in which said blades are immersed,
  whereby the mixture comprising the polymer (P) and the compound (C) is forced to pass through the hole(s) of the perforated plates and is then cut by the blades, which leads to fractionation of the mixture stream comprising the polymer (P) and the compound (C) into the form of drops, the thereby formed drops thus being again injected into the bath comprising the non-solvent liquid (NS) where they precipitate as solid particles (typically granules);

($\epsilon$3) the solid particles (of the granule type) synthesised in step ($\epsilon$2) are separated from the bath comprising the liquid (NS), (ϵ4) the thereby separated solid particles (of the granule type) are washed in order to at least partly remove the solvent (S) used in the polymer (P) solution; and then (ϵ5) the solid particles (or granules) are dried.

The compound (C) used in step (ϵ1) of the method may be selected from mineral oxides, silico-aluminates and active coals. The compound (C) may for example be selected from adsorbents and catalyst supports. Preferably, this is silica, preferably a precipitation silica typically obtained by reaction of a silicate (typically an alkaline metal silicate, such as sodium silicate) with an acidifying agent (typically sulfuric acid), generally by adding an acidifying agent on a starter of silicate, and/or total or partial simultaneous addition of an acidifying agent and of silicate on a starter of water and silicate, with which a suspension of precipitated silica may be obtained, said silica being usually separated from the suspension, in particular by filtration (with a filtration cake being obtained), and then dried (generally by atomization).

Regardless of its nature, the compound (C) used in step (ϵ1) advantageously has a relatively high specific surface area. It generally has, in particular in the case of precipitated silica and/or active coal, a BET specific surface area of at least 100 $m^2/g$, preferably at least 200 $m^2/g$, in particular greater than 450 $m^2/g$. With the succession of the aforementioned steps (ϵ1) to (ϵ5), it is possible to retain a good portion (generally at least 60%) of the specific surface area of the compound (C) in the synthesized supporting composite material (M).

The compound (C) used in step (ϵ1) advantageously has at least one and preferably the whole of the preferential characteristics defined for the materials (C) adapted to the application of step (e1) of the method according to the embodiment described above in the present description, i.e.:

- a mean particle size of at least 0.5 μm, in particular comprised between 0.5 and 100 μm (advantageously comprised between 0.5 and 50 μm, notably between 0.5 and 20 μm, for example between 2 and 15 μm, when the compound (C) is precipitated silica); and/or
- in particular when the compound (C) is silica, notably precipitated silica, a DOP oil adsorption of less than 260 mL/100 g, notably less than 240 mL/100 g for example less than 225 mL/100 g, and which may be less than 210 mL/100 g, or even less than 205 mL/100 g, this DOP oil adsorption being generally greater than or equal to 80 mL/g, typically greater than 145 mL/100 g, for example greater than 180 mL/100 g; and/or
- a CTAB specific surface area greater than 280 $m^2/g$, notably greater than 300 $m^2/g$, in particular greater than 330 $m^2/g$, for example greater than 350 $m^2/g$; this specific surface area being generally less than or equal to 450 $m^2/g$, in particular when this is silica, notably precipitated silica; and/or
- a pore volume ($V_{d25}$), formed by the pores with a diameter of less than 25 nm, greater than 0.8 mL/g, notably greater than 0.9 mL/g; and/or
- a pore diameter ($d_{tp}$), for pores with a diameter of less than 25 nm, taken at the maximum of the volume pore size distribution, of less than 12.0 nm, in particular less than 8.0 nm.

Thus, compounds (C) which are well adapted to the application of step (e1) are notably precipitated silicas having the following features:

- a DOP oil adsorption of less than 260 mL/100 g, notably less than 240 mL/100 g, in particular less than 225 mL/100 g; and
- a pore volume ($V_{d25}$), formed by the pores with a diameter of less than 25 nm, greater than 0.8 mL/g, notably greater than 0.9 mL/g, for example at least 0.95 mL/g; and
- a CTAB specific surface area greater than 280 $m^2/g$, notably greater than 300 $m^2/g$, in particular greater than 330 $m^2/g$, for example greater than 350 $m^2/g$; and
- preferably, a BET specific surface area greater than 450 $m^2/g$, for example greater than 510 $m^2/g$.

A precipitation silica of this type may for example be prepared by a method comprising the reaction of a silicate with an acidifying agent; whereby a suspension of precipitated silica is obtained and then separated and dried, (notably by atomization) of this suspension, where the reaction of the silicate with the acidifying agent is preferably carried out according to the successive steps (i), (i'), (ii), (iii) and (iv) as defined above in the present description.

Regardless of its exact nature, the compound (C) applied in step (e1) may be a functionalized compound, notably by grafting or adsorption of organic molecules, for example comprising at least one amino, phenyl, alkyl, cyano, nitrile, alkoxy, hydroxy, amide, thio and/or halogen function.

In step (ϵ1), the introduction of the compound (C) and of the solution of the polymer (P) into the extruder leads to the formation of a mixture of the compound (C) and of the polymer (P) in solution within the extruder, advantageously in the form of a mixture which is as homogeneous as possible.

According to an alternative of the method of the invention, the compound (C) and the polymer (P) solution may be separately introduced into the extruder, in which case their mixing takes place within the actual extruder, notably under the effect of the movement of the screw(s) which the extruder generally includes.

Alternatively, according to another alternative, the compound (C) and the polymer (P) solution are mixed beforehand together before their being introduced into the extruder. In this case, premixing of the compound (C) and of the polymer (P) solution is advantageously carried out by adding the compound (C) into the polymer (P) solution, preferably with stirring. If necessary, the addition of the compound (C) into the solution of polymer (P) is advantageously carried out gradually, notably so as to obtain a mixture as homogeneous as possible. This preferred preliminary step amounts to dispersing the compound (C) (in solid form) in a medium formed by the polymer (P) in solution in one of its solvents. Advantageously, the prepared mixture of the compound (C) and of the polymer (P) solution appears as a homogeneous slurry. In order to obtain such a homogeneous slurry, a mixer with a rotor equipped with blades or pins, for example of the Rotolab Zanchetta type or preferably a mixer with a rotor equipped with ploughshares, notably a Lödige type mixer with moderate shearing rates, may typically be used. The mixture may be made at room temperature (temperature of the installation site typically between 5 and 35° C.).

The solvent (S) used within the scope of a method comprising the aforementioned steps (ϵ1) to (ϵ5) may advantageously be selected from the preferential solvents (S) which have been defined above in the present description within the scope of the method comprising the steps (e1) to (e5).

Thus, in particular, the solvent (S) applied within the scope of steps (ϵ1) and (ϵ2) may advantageously be acetic acid (notably when the polymer (P) is cellulose acetate), water (in particular in the case when the polymer (P) is cellulose sulfate, polyvinyl alcohol or gum arabic) or a naphthenic oil (in particular in the case when the polymer (P) is polyethylene. When the polymer (P) applied within the scope of steps (ϵ1) and (ϵ2) is cellulose acetate, the solvent (S) is preferably an acetic acid+water mixture, the solution of the polymer then typically having the following contents (expressed by mass based on the total mass of the cellulose acetate, of the acetic acid and of the water):
cellulose acetate: 10 to 25%,
acetic acid: 65 to 80%,
water: 3 to 15%.

According to a particular embodiment, a solvent is added to the mixture of polymer (P) and of compound (C) which notably allows reduction in the viscosity of the mixture. This addition of solvent (for example acetic acid in the case when the polymer (P) is cellulose acetate) may typically be carried out by adding said solvent during the mixing, after the mixing (typically when the mixture is made prior to its introduction into the extruder), or else in the solution of polymer (P) prior to the mixing of the solution of the polymer (P) with the compound (C).

The proportions of polymer (P) and of compound (C) in the mixture depend on the desired proportions in the final composite material. Generally, the polymer (P) content within the mixture is comprised between 10 and 95%, preferably between 15 and 45%, by weight and compound (C) content is comprised between 5 and 90%, preferably between 55 and 85%, by weight, based on the total mass of the mixture.

Preferably, the extruder used in steps ($\epsilon$1) and ($\epsilon$2) is a twin screw extruder (notably with co-rotation), for example an extruder of the Clextral BV21 type. The working pressure of the extruder is then generally comprised between 10 and 40 bars, for example between 20 and 30 bars.

The perforated plate present at the outlet of the extruder which is applied for the granulation carried out in step ($\epsilon$2) is provided with one or preferably several hole(s) (notably between 1 and 200 holes, in particular between 20 and 200 holes, for example between 30 and 180 holes). The diameter of the holes present on the plate may typically vary between 0.1 and 2 mm, in particular between 0.2 and 1 mm, for example between 0.3 and 0.5 mm.

Although this is a non-preferred alternative, the steps ($\epsilon$1) and ($\epsilon$2) may optionally be conducted by not applying an extruder, but another means with which the mixture obtained from the compound (C) and from the solution of polymer (P) may be pushed through the hole(s) (for example a simple piston within an enclosure).

The blades present at the outlet of the extruder downstream from the perforated plate are typically cutting blades or knives. These blades generally equip a granulator placed at the outlet of the extruder (in which case the notion of "outlet of the extruder" in the sense of the present description encompasses the granulator). The blades present at the outlet of the extruder may typically be present in an amount from 2 to 10, notably 4 and 7. Advantageously these are rotating blades (cutting blades or rotary knives), the speed of rotation is then typically comprised between 2,000 and 7,500 rpm, in particular between 3,000 and 5,000 rpm.

For applying the step ($\epsilon$2), the outlet of the extruder opens out into a bath comprising the non-solvent liquid (NS) and the blades present at the outlet of the extruder are immersed in this bath. The plate perforated with hole(s) may as for it be either immersed or not in this bath.

As a non-solvent (NS) in step ($\epsilon$2), it is notably possible to use water (in particular when the polymer (P) is cellulose acetate and the used solvent is acetic acid), or else further an aqueous solution of acetic acid (in particular when the polymer (P) is cellulose acetate and the used solvent is acetic acid), ethanol (in particular in the case when the polymer (P) is cellulose sulfate and the solvent used is water), a carboxylic acid (in particular in the case when the polymer (P) is a polyvinyl alcohol and the solvent used is water), an alcohol (in particular when the case when the polymer (P) is gum arabic and the solvent used is (hot) water), hexane (in particular when the case when the polymer (P) is polyethylene and the solvent used is a naphthenic oil). It is particularly interesting to use water as a non-solvent liquid (NS).

In step ($\epsilon$2) the mixture of polymer (P), of solvent (S) and of compound (C) is fractionated into drops under the effect of passing through the hole(s) of the perforated plate (ensured by the pressure exerted inside the extruder) and then of being cut by the blades. The thereby formed drops are converted into solid particles (typically granules) of composite material. More specifically, under the effect of desolvation obtained when the formed drops are put into contact with the non-solvent liquid (NS), the polymer (P) precipitates, whereby a porous solid matrix in which the compound (C) is dispersed, is formed from the polymer.

In order to regulate the formation of the particles from the drops, according to a particular embodiment, it is possible to add, during step ($\epsilon$2), some additional non-solvent liquid (NS) and/or one or more additional polymers of the type of the polymer (P).

The non-solvent (NS) bath applied in step ($\epsilon$2) is preferably not static, and it preferentially consists in a stream or flow of non-solvent liquid (NS). The velocity of the stream (or flow) may for example be comprised between 5 and 20 L/min, notably between 8 and 15 L/min, in particular for a flow rate (of the effluent) at the extruder outlet from 100 to 300 g/min, for example 200 g/min.

Moreover, notably for optimizing the desolvation effect, it is often preferable that the temperature of the non-solvent (NS) bath applied in step ($\epsilon$2) be greater than that of the mixture of compound (C) and of polymer (P) which stems from the extruder. Thus, it is generally preferable that at least during the step ($\epsilon$2), the temperature of the bath comprising the non-solvent (NS) liquid, be comprised between 25 and 80° C., in particular between 45 and 70° C., for example between 55 and 65° C.

At the end of step ($\epsilon$2), a composite material (M) is obtained in the form of a dispersion of porous solid particles in a liquid medium containing the solvent (S) and the non-solvent (NS) liquid. In step ($\epsilon$3), these solid particles of composite material (M) are separated from the liquid medium. This solid/liquid separation may be ensured by any known separation or recovery means. They are for example recovered by means of a filtering bag.

In step ($\epsilon$4), the solid particles of composite material (M) which have been recovered in step ($\epsilon$4), are washed (in one or several washings), in order to at least partly and preferably totally remove the residual solvent. This washing may be carried out with water (for example by immersion in water for several hours), notably in the case when the solvent used for the polymer (P) is acetic acid. Generally, before applying step ($\epsilon$4), the product obtained at the end of step ($\epsilon$3) is separated from the liquid used in step ($\epsilon$3).

After step ($\epsilon$4), and before step ($\epsilon$5), it is optionally possible to conduct a (preferably mild) dewatering step, in order to remove the washing liquid used in step ($\epsilon$4).

The drying step ($\epsilon$5) allows removal of the washing liquid used in step ($\epsilon$4). Notably when the washing liquid is water, and in particular when the polymer (P) is cellulose acetate, the drying step ($\epsilon$5) may advantageously be carried out at a temperature comprised between 40 and 110° C., for example in a ventilated device (notably an oven or a fluid bed), generally for 2 to 60 hours, in particular between 4 and 30 hours.

The succession of steps (e1) to (e5) may occur batchwise or preferably continuously. In particular, it is preferable that the succession of the steps (e1) and (e2) occur continuously.

It should be noted that the method described above, which includes the succession of steps (e1) to (e5), gives the possibility of accessing in a relatively simple and rapid way, granules of material (M), and this with a restricted number of steps, in particular when it is conducted according to a continuous mode. Indeed, the synthesis of particles of the granule type takes place very easily: drops of mixture (compound (C)+polymer (P) in solution) are very simply formed upon passing through the hole(s) of the perforated plate and being cut out by the blades at the outlet of the extruder, and these drops harden directly as particles, (typically granules) because of their contact with the non-solvent (NS) liquid medium, this conversion taking place without adhesion between the forming granules, and the formed particles may then be recovered with simple washing and drying steps. Thus, with the succession of steps (e1) to (e5) it is possible to obtain in a simple and direct way granules having a predefined size and this without requiring any calibration, sifting and/or milling step.

In the absorbent used within the scope of the present invention, a composite material (M) as defined above is used as a support for at least one $CO_2$ capture agent.

The $CO_2$ capture agent which is present in the supported condition in an absorbent according to the invention advantageously comprises at least one compound selected from monoamines, polyamines, monoguanidines, and polyguanidines, preferably having a pKa above 12.

As in indication of suitable $CO_2$ capture agents within the scope of the present invention, mention may notably be made of:

monoethanolamine $H_2N$—$(CH_2)_2$—OH (so-called MEA), alone or as a mixture with piperazine;

diethanolamine $HN[(CH_2)_2$—$OH]_2$ (so-called DEA); tetraethylenepentamine;

polyamines, preferably those having a molecular mass by weight Mw comprised between 800 and 750,000;

hyperbranched compounds resulting from the addition of aminated alkoxysilanes with aziridine;

polyguanidines, preferably having a pKa above 12, advantageously polyguanidines of the following formula:

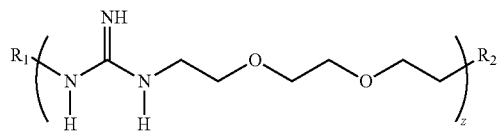

wherein z is typically comprised between 1 and 4;

aminated polysaccharides such as for example chitin;

choline, advantageously as a mixture with urea;

polyamidines, preferably with a pKa above 12, advantageously polyamidines fitting the following formula:

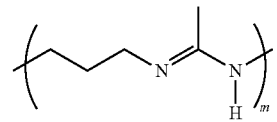

wherein z is typically comprised between 1 and 4.

More generally, it is possible to use within the scope of the present invention other types of $CO_2$ capture agents, provided that they may be supported on a composite material (M) as defined above in the present description. As an example, the $CO_2$ capture agent may comprise a compound selected from:

polyethers, notably polyethers fitting one of the formulae below:

$R^a$(—$CH_2$—$CH_2$—O—)$x$-$R^b$ $R^a$(—$CH_2$—$CH(CH_3)$—O—)$y$-$R^b$ $R^a$(—$CH_2$—$CH_2$—O—)$z$(—$CH_2$—$CH(CH_3)$—O—)$z'$-$R^b$ wherein:
each of the groups $R^a$ and $R^b$, either identical or different, designates an alkyl, aryl or arylalkyl group (comprising typically from 1 to 10 carbon atoms); and
x, y, z and z' are integers ranging from 1 to 100 and preferably less than 50, the sum z+z' being advantageously less than 100, more preferentially less than 50.

ionic liquids such as for example those comprising tetraphosphonium amino acids, methylimidazolium or methylimidazolium salts (notably associated with counterions of the chloride-bromide type and salts of the anions $PF_6^-$ or $BF_4^-$), or ionic compounds fitting one of the following formulae:

$(R^c)_4P^+X^-$ $(R^c)_4N^+X^-$ wherein:
each of the 4 groups Rc, either identical or different designate an alkyl, aryl or arylalkyl group (typically comprising from 1 to 10 carbon atoms); and
$X^-$ designates an anion, preferably $Cl^-$, $BR^-$, $PF_6^-$ or $BF_4^-$.
carbenes.

In the sense of the present description, the term of "carbene" refers to a chemical species comprising a divalent carbon bearing two non-binding electrons, this divalent carbon bearing typically 6 valence electrons and not bearing an electric charge. As carbenes which may be used within the scope of the present invention, mention may notably be made of carbenes, so-called N-heterocyclic carbenes ("NHC") or carbenes with an alkylaminocyclic unit, so-called CAACs "Cyclic AlkylAminoCarbene"), of the type of those described for example in WO 2006/138166, where the method for preparing these compounds is described.

According to an embodiment which may be contemplated when a carbene is used as a $CO_2$ capture agent according to the invention, the latter may be formed in situ from a carbene precursor. Within the specific scope, the absorbent according to the invention is obtained in situ from an absorbent precursor comprising said carbene precursor supported on the composite material (M). Precursors of carbenes which may be used for this purpose are in particular:

carbene and alcohol adducts, of the type of those described for example in *J. Am. Chem. Soc.*, Vol. 127, p. 9079, (2005) or the carbenes in dimerized form of the type described for example in *Angew. Chem. Int. Ed.* Vol. 112, p. 541 (2000), which release carbenes when they are heat-treated;

imidazolium salts (notably a carboxylate, sulfate, hydrogensulfate, sulfonate, phosphate, hydrogenphosphate, halide, perchlorate or borate) such as those notably described in WO97/34875, US 2005/0249925, WO 2005016941, or U.S. Pat. No. 7,109,348, which form a carbene by reaction with a base.

Regardless of its exact nature, the $CO_2$ capture agent is generally present in the absorbent according to the invention in a content comprised between 0.5 and 75% by mass based on the total mass of the absorbent, this $CO_2$ capture agent content within the absorbent being advantageously of at least 5% by mass and more preferentially of at least 10% by mass, and still more advantageously of at least 25% by mass, the $CO_2$ absorption capacity being generally all the higher since the capture agent content is high. Although interesting results in terms of $CO_2$ extraction are obtained, including those for low capture agent contents (for example between 0.5 and 25% by mass), the $CO_2$ capture agent content within the absorbent according to the invention is more advantageously greater than 25% by mass, for example comprised between 25 and 75% by mass, notably between 30 and 60%, for example between 40 and 55% by mass, based on the total mass of the absorbent.

The $CO_2$ capture agent present in the absorbent according to the invention may typically be introduced onto the material (M) by impregnation, according to any impregnation method known per se. It should be emphasized in this matter that the material (M) used within the scope of the present invention has very good absorption properties, with which it may be easily and effectively impregnated by most $CO_2$ capture agents.

An impregnation of the $CO_2$ capture agent on the material (M) may notably be achieved according to a route of the heterogeneous type, i.e. by putting it into direct contact with the $CO_2$ capture agent on the composite material (M), typically by mixing the agent and the composite material in the powder condition.

Alternatively, such an impregnation may also be obtained according to a route of the more homogeneous type, i.e. by putting the $CO_2$ capture agent and the composite material (M) in contact within a solvent. If necessary, this solvent may be selected from aprotic organic solvents such as toluene, dichloromethane, xylene or THF.

In order to achieve impregnation, it is also possible to use the $CO_2$ capture agent in the liquid state (for example as a solution in a solvent if required) and impregnate it by spraying it on the material (M) in a mixer, for example a V-mixer with a rotary inner shaft, provided with plates through which the $CO_2$ capture agent in the liquid state is sprayed and on which clod breaking knives are advantageously attached. Notably, when the $CO_2$ capture agent in the liquid state has a relatively large viscosity, it may advantageously be heated (for example between 40 and 90° C., notably between 50 and 85° C.) with which its fluidity and hence the effectiveness of the impregnation may be improved.

The specific absorbents of the present invention, which comprise the $CO_2$ capture agent in the supported condition on the composite material (M) proves to be particularly efficient for reducing the $CO_2$ content within a gas effluent.

The gas treatment method of the invention using the specific absorbents may be used for treating any gas containing $CO_2$, notably for treating flows stemming from thermal power stations, gas turbines, petrochemical refining units, cement works, or waste incinerating units.

As a general rule, the $CO_2$ content in a gas treated according to the invention (i.e. the gas which is intended to be treated according to the invention and which is subject to the treatment according to the invention) may vary to a rather wide extent and it is preferably comprised between 1 and 30% by mass, for example between 7 and 25% by mass.

The treatment method of the invention may be carried out according to any known means per se for putting into contact the gas to be treated and the absorbent comprising the $CO_2$ capture agent (A) impregnated on the supporting material (M).

Preferably, in the method of the invention, the putting of the gas to be treated and of the absorbent into contact is achieved by using the absorbent in the form of a fixed bed through which is passed the gas to be treated. The absorbent according to the invention proves to be particularly adapted to this embodiment. On this subject, the results of the work which has been carried out by the inventors, in particular indicate that the pressure drops obtained when the gas flow passes through the fixed bed are acceptable, and that the absorbent used does not tend to form fines.

Alternatively, the putting of the gas to be treated and of the absorbent in contact may also be achieved by using the absorbent in the form of a fluidized bed (and this all the more since the mean particle size D50 of the material (M) is small) or in the form of a transported bed (in particular the kinetics of the reaction of the $CO_2$ and the $CO_2$ capture agent is fast).

As a general rule, the treatment of the gas containing $CO_2$ according to the method of the invention is preferably carried out by putting the absorbent and the support into contact at a temperature T1 comprised between 10 and 100° C., for example between 25 and 90° C., typically at a temperature below 80° C., or even below 50° C., for example at room temperature (notably between 10 and 30° C.).

In most cases, the $CO_2$ capture agent as obtained at the aforementioned temperature T1 is reversible, i.e. it is possible to recover the $CO_2$ most frequently by heat-treating the absorbent which has captured $CO_2$ typically by subjecting it to a temperature T2 for releasing $CO_2$ above T1, advantageously of at least 20° C., the difference between both temperatures (T2−T1) being typically comprised between 20 and 50° C.

Thus, according to a particular embodiment, the method of the present invention comprises:

a first step, in which the gas to be treated containing $CO_2$ and the absorbent as defined above are put into contact at a first temperature T1 comprised between 10 and 100° C., for example between 25 and 90° C. (typically at a temperature below 80° C., or even below 50° C., for example at room temperature and notably between 10 and 30° C.), whereby at least one portion of the $CO_2$ present into gas is captured by the absorbent; and then a second step, wherein a gas flow comprising the $CO_2$ is recovered from the absorbent having captured the $CO_2$ obtained in the first step, by subjecting this absorbent having the captured $CO_2$ to a second temperature T2 above the first temperature T1, this second temperature T2 being generally comprised between 50 and 180° C., typically between 80 and 150° C., the temperature difference (T2−T1) being advantageously comprised between 20 and 50° C.

According to this embodiment, in the first step, the sought $CO_2$ depletion according to the invention is obtained (which typically gives the possibility of contemplating discharge of the thereby treated gas into the atmosphere). Moreover during the application of the second step, all or part of the CO₂ which has been absorbed by the absorbent in the first step is released out of this absorbent under the effect of the heat treatment. A gas flow is thereby released comprising $CO_2$, generally a particularly pure $CO_2$ flow typically comprising at least 95% by mass, or even at least 98% by mass of $CO_2$. This release is most often achieved out of the treated gas, so as to obtain a gas flow comprising $CO_2$ (generally consisting essentially of $CO_2$, the released gas typically containing $CO_2$ in a content of the order of at least 95%, or at least 98%), separated from the flow of $CO_2$-depleted treated gas.

In other words, this particular embodiment gives the possibility of obtaining two separate gas flows from a gas initially containing $CO_2$, i.e.:
 (i) a first flow containing the $CO_2$-depleted treated gas (obtained in the first step); and
 (ii) a second flow containing $CO_2$ (obtained in the second step)

The gas flow (ii) containing $CO_2$ which is obtained by heat treatment of the absorbent, is generally very rich in $CO_2$, and most often it essentially consists of $CO_2$ (this is typically a gas flow comprising at least 90% by mass, most often at least 95% by mass, or even at least 98% by mass of $CO_2$).

This $CO_2$-rich flow (ii) may notably be applied in reactions with nucleophilic or electron-donor compounds (organometallic reagents of the Grignard reagent type, water, alcoholates, amines . . . . ), in reactions with methanol for the synthesis of dimethyl carbonate or with ethers for the synthesis of dialkylcarbonates, or else, more generally in any reaction involving $CO_2$ as described in *Chem. Rev.*, Vol. 107, pp. 2365-2387 (2007). Within the scope, it is advantageous to use $CO_2$ immediately after its release from the absorbent.

In the embodiment of the invention, applying both aforementioned steps for putting the gas to be treated containing the $CO_2$ and the absorbent into contact; and then for recovering the $CO_2$ by heat treatment of the reacted absorbent may advantageously be exploited for providing a $CO_2$-rich gas flow from a gas having a lower $CO_2$ content. Typically, in the first step, it is for example possible to treat a gas initially comprising from 1 to 30% by mass, preferably from 7 to 25% by mass of $CO_2$, whereby a gas flow is generated comprising at least 95% by mass of $CO_2$, or even at least 99% by mass of $CO_2$.

The example which follows is given as an illustration and not as a restriction of the present invention.

EXAMPLE

An Amine (MEA) Supported on a Silica/cellulose Acetate Composite

In this example, an absorbent according to the invention was synthesized, comprising monoethanolamine (MEA) as a $CO_2$ capture agent.

This monoethanolamine was impregnated on a composite material (M1) comprising 70% by mass of cellulose acetate and 30% by mass of silica, appearing before impregnation as a powder having the characteristics below:

| | |
|---|---|
| mean particle size (D50) | 568 μm |
| pore volume Vd1 (volume of the pores having a diameter comprised between 3.6 and 1,000 nm) | 1 cm³/g |
| cohesion number $IC_N$ ($D50_{4\,bars}/D50_{0\,bars}$ ratio) | 0.81 |
| mean diameter of pores having a diameter comprised between 3.6 and 1,000 nm | 14.5 nm |
| BET surface area | 283 m²/g |
| PFD | 0.35 |

This composite material (M1) was prepared under the conditions below:

A solution (S1) of cellulose acetate in acetic acid was prepared (comprising by mass: 18% of cellulose acetate, 76% of acetic acid and 6% of water). The cellulose acetate used had a substitution degree of 2.5.

A homogeneous mixture of 5,271 g of this solution (S1) and of 2,360 g of a precipitation silica having the following characteristics, was made:

| | |
|---|---|
| BET specific surface area | 563 nf/g |
| DOP oil absorption | 244 mL/100 g |
| humidity (according to the ISO787/2 standard 105° C. - 2 hours) | 7.6% by mass |
| pH | 6.9 |
| water-soluble salt mass content | 0.8% |

The mixing of the solution (S1) and of the silica was carried out in a ploughshare mixer (Lodige) with a capacity of 20 L under the following conditions:
 introduction of the totality of the solution (S1) into the mixer
 starting the mixer (speed of rotation: 50 rpm)
 gradual introduction of the silica (addition time: 2 minutes 30)
 maintaining stirring for 5 minutes (speed of rotation 50 rpm)
 maintaining stirring with an increase in the speed of rotation until the maximum torque accepted by the mixer is obtained (speed of rotation: 150 rpm for 4 minutes 30)

A mixture in the form of a homogeneous slurry is thereby obtained.

5% by mass of acetic acid (99.9% purity) are added to the slurry and the mixture was kneaded by hand until total absorption of the acid.

A mass of 1 kg of the mixture obtained at the end of the kneading was introduced into an extruder by means of a hydraulic press, this in triplicate, (Clextral BC21 with a length of 90 cm, only provided with components of the transport screw, and applied at a speed of 80 rpm). The extruder was used without any temperature control means, a rise in temperature occurring alone under the effect of friction. At the outlet of the extruder, a granulation system (Laboratory Pelletizer Unit 5-LPU-Gala) was set up, provided with a granulation head with 7 knives, and the extrudate exiting the extruder was passed under pressure through a plate comprising 120 die holes (holes of 0.5 mm at 70° C.), at a flow rate of 200 g/min.

The granulation head, located at the outlet of the die holes is placed in a precipitation bath containing water as a precipitation medium. This head provided with 7 knives, was set into rotation at an adjusted speed of 5,000 rpm. At this head, water brought to 60° C., as a precipitation medium, was circulated with a flow rate of 12 L/min. Every minute, 1 liter of the precipitation bath was replaced with 1 liter of renewal water, brought to 60° C.

Thus, shaped composite granules were obtained, which were collected in a net and then stored for one night in water before drying them in the drying area of the LPU at 60° C.

The drying was conducted until a constant mass is obtained, whereby the composite material (M1) was obtained.

The impregnation of ethanolamine on the composite material (M1) was conducted in a V mixer of 7 liters of the Patterson Kelley brand, provided with plates through which ethanolamine is sprayed and on which clod breaking knives are attached, this V-shaped mixer rotating at 20 rpm, with an inner shaft rotating at 1,900 rpm. 800 g of the composite material (M1) was loaded into the mixer, and then 531.3 g of MEA were sprayed at a temperature of 20° C. on this composite material for 10 minutes. Stirring was maintained in order to homogenize for a further 5 minutes.

An absorbent according to the invention was thereby obtained, consisting of 42.5% by mass of the $CO_2$ capture agent (MEA) and of 57.5% by mass of the composite material (M1). This absorbent has a PFD equal to 0.60.

This absorbent proves to be well adapted for extracting $CO_2$ in a gas flow. Upon contact with a gas flow containing $CO_2$, the supported MEA captures $CO_2$ by forming a salt which remains localized on the surface of the absorbent, ammonium carboxylate). By simply heating the absorbent, the $CO_2$ is released from the salt, whereby the absorbent is regenerated, while obtaining evolvement of high purity $CO_2$.

The invention claimed is:

1. A method for treating a gas containing $CO_2$ for reducing $CD_2$ content within said gas, the method comprising putting the gas to be treated into contact with an absorbent which comprises at least one $CO_2$ capture agent, this $CO_2$ capture agent being supported on a solid composite material (M) which comprises:
    at least one polymer (P), and
    at least one compound (C) selected from mineral oxides, silico-aluminates and active coal,
    said material (M) having:
    a mean particle size D50 greater than or equal to 100 μm,
    a pore volume (Vd1), formed by the pores with a diameter comprised between 3.6 nm and 1,000 nm, of at least 2.0 cm³/g, wherein the $CO_2$ capture agent is present in the absorbent in a content comprised between 5% and 75% by mass based on the total mass of the absorbent.

2. The method of claim 1, wherein the compound (C) is silica.

3. The method according to claim 1, wherein the polymer (P) is selected from cellulose and its derivatives; starch and its derivatives, alginates and their derivatives; polyethylene; guars and gums of the guar type, as well as their derivatives; and polyvinyl alcohols and their derivatives.

4. The method according to claim 3, wherein the polymer (P) is a derivative of cellulose.

5. The method of claim 3, wherein the polymer (P) is cellulose acetate.

6. The method according to claim 1, wherein the material (M) has a cohesion such that its level of particles with a size of less than 100 μm obtained after an aft pressure stress of 2 bars is less than 1.5% by volume.

7. The method according to claim 1, wherein the material (M) has a cohesion number $IC_N$, calculated by the ratio of the number mean particle size after an air pressure stress of 4 bars to the number mean particle size without any aft pressure stress, of more than 0.40.

8. The method according to claim 1, wherein the compound (C) is a mineral oxide.

9. The method according to claim 8, wherein the compound (C) is precipitated silica.

10. The method according to claim 1, wherein the material (M) consists in cellulose acetate and precipitated silica.

11. The method according to claim 1, wherein the material (M) has:
    a mean particle size D50 of at least 300 μm;
    a BET specific surface area greater than 300 m²g; and
    a cohesion such that its level of particles with a size of less than 100 μm obtained after an air pressure stress of 2 bars is equal to 0,0% by volume.

12. The method according to claim 1, wherein the material (M) has:
    a mean particle size D50 of at least 400 μm;
    a BET specific surface area of at least 200 m²g; and
    a cohesion number $IC_N$, calculated as the ratio of the number mean particle size after an air pressure stress of 4 bars to the number mean particle size without any air pressure stress, of more than 0.60.

13. The method according to claim 1, wherein, in the material (M), the polymer (P) content is comprised between 10% and 95% by mass and the compound (C) content is comprised between 5% and 90% by mass, based on the total mass of the composite material (M).

14. The method according to claim 1, wherein the $CO_2$ capture agent comprises at least one compound selected from monoamines, polyamines, monoguanidines, and polyguanides.

15. The method according to claim 1, wherein the $CO_2$ capture agent comprises a carbine.

16. The method according to claim 1, wherein the $CO_2$ capture agent is present in the absorbent in a content comprised between 25% and 75% by mass based on the total mass of the absorbent.

17. The method according to claim 1, wherein the gas which is subject to the treatment, initially comprises from 1% to 30%, by mass of $CO_2$.

18. The method according to claim 1, wherein the putting of the gas to be treated and of the absorbent into contact is achieved by using the absorbent as a fixed bed through which the gas to be treated is passed.

19. The method according to claim 1, which comprises
    a first step in which the gas to be treated containing $CO_2$ and the absorbent are put into contact at a first temperature T1 comprised between 10° C. and 100° C. whereby at least one portion of the $CO_2$ present in the gas is captured by the absorbent; and then
    a second step wherein the $CO_2$ captured by the absorbent is released by subjecting the absorbent having captured the $CO_2$ in the second temperature T2 above the first temperature T1, this second temperature T2 being comprised between 50° C. and 180° C., the temperature difference(T2−T1) being comprised between 20° C. and 50° C.

20. The method according to claim 1, wherein the material (M) has a mean particle size D50 of at least 150 μm.

21. The method according to claim 1, wherein the material (M) has a pore volume Vd1, formed by the pores with a diameter comprised between 3.6 nm and 1,000 nm, of at least 0.4 cm³/g.

22. A method for carrying out $CO_2$ absorption comprising a step of absorption of $CO_2$ onto an absorbent that comprises at least one $CO_2$ capture agent selected from monoamines, polyamines, monoguanidines and polyguanidines, this capture agent being impregnated on a support formed by a solid composite material (M) which contains:
    at least one polymer (P); and
    at least one compound (C) selected from mineral oxides, silico-aluminates and active coal, said material (M) having:

a mean particle size D50 greater than or equal to 100 μm, a pore volume (Vd1), formed by the pores with a diameter comprised between 3.6 and 1,000 nm, of at least 0.2 cm$^3$/g, wherein the $CO_2$ capture agent is present in the absorbent in a content comprised between 5% and 75% by mass based on the total mass of the absorbent.

23. A method for reducing the $CO_2$ content in a gas containing $CO_2$, comprising a step of absorption of $CO_2$ onto an absorbent that comprises at least one $CO_2$ capture agent selected from monoamines, polyamines, monoguanidines and polyguanidines, this capture agent being impregnated on a support formed by a solid composite material (M) which contains:

at least one polymer (P); and at least one compound (C) selected from mineral oxides, silico-aluminates and active coal, said material (M) having:

a mean particle size D50 greater than or equal to 100 μm, a pore volume (Vd1), formed by the pores with a diameter comprised between 3.6 and 1,000 nm, of at least 0.2 cm$^3$/g, wherein the $CO_2$ capture agent is present in the absorbent in a content comprised between 5% and 75% by mass based on the total mass of the absorbent.

24. A method for reducing the $CO_2$ content in flows stemming from thermal power stations, gas turbines, petrochemical refining units, cement works, or units for incinerating waste, comprising a step of absorption of $CO_2$ onto an absorbent that comprises at least one $CO_2$ capture agent selected from monoamines, polyamines, monoguanidines and polyguanidines, this capture agent being impregnated on a support formed by a solid composite material (M) which contains:

at least one polymer (P); and at least one compound (C) selected from mineral oxides, silico-aluminates and active coal, said material (M) having:

a mean particle size D50 greater than or equal to 100 μm, a pore volume (Vd1), formed by the pores with a diameter comprised between 3.6 and 1,000 nm, of at least 0.2 cm$^3$/g, wherein the $CO_2$ capture agent is present in the absorbent in a content comprised between 5% and 75% by mass based on the total mass of the absorbent.

* * * * *

UNITED STATES PATENT AND TRADEMARK OFFICE
CERTIFICATE OF CORRECTION

PATENT NO. : 9,084,960 B2
APPLICATION NO. : 13/121860
DATED : July 21, 2015
INVENTOR(S) : Pierre-Yves Lahary et al.

It is certified that error appears in the above-identified patent and that said Letters Patent is hereby corrected as shown below:

In the Claims

Column 25, line 26: "CD2 content" should read --CO2 content--

Column 25, lines 38-39: "at least 2.0 cm3/g" should read --at least 0.2 cm3/g--

Column 25, line 55: "aft pressure" should read --air pressure--

Column 25, line 60: "aft pressure" should read --air pressure--

Column 26, line 4: "300 m2g" should read --300 m2/g--

Column 26, line 7: "0,0% by volume" should read --0.0% by volume--

Column 26, line 27: "carbine" should read --carbene--

Signed and Sealed this
Twenty-fourth Day of November, 2015

Michelle K. Lee
*Director of the United States Patent and Trademark Office*